United States Patent [19]
Hagiwara et al.

[11] Patent Number: 5,387,348
[45] Date of Patent: Feb. 7, 1995

[54] METHOD OF MIXED-BED FILTRATION AND DEMINERALIZATION WITH ION-EXCHANGE RESINS

[75] Inventors: Masahiro Hagiwara; Hideo Kawazu; Takeshi Izumi, all of Kanagawa, Japan

[73] Assignee: Ebara Corporation, Tokyo, Japan

[21] Appl. No.: 24,111

[22] Filed: Feb. 23, 1993

Related U.S. Application Data

[63] Continuation-in-part of Ser. No. 790,754, Nov. 12, 1991, abandoned.

[30] Foreign Application Priority Data

Nov. 9, 1990 [JP] Japan .................................. 2-302587
Nov. 8, 1991 [JP] Japan .................................. 3-319645

[51] Int. Cl.$^6$ ........................................... C02F 1/42
[52] U.S. Cl. ................................. 210/662; 210/678; 210/686; 210/688; 521/26
[58] Field of Search ............... 210/670, 678, 686, 688, 210/662; 521/26

[56] References Cited

U.S. PATENT DOCUMENTS

| | | | |
|---|---|---|---|
| 2,773,830 | 12/1956 | Farmer et al. | 210/24 |
| 3,719,591 | 3/1973 | Crits | 210/33 |
| 4,395,335 | 7/1983 | Saito | 210/686 |
| 4,663,051 | 5/1987 | Flynn et al. | 210/686 |
| 4,975,201 | 12/1990 | Ma | 210/686 |

FOREIGN PATENT DOCUMENTS

| | | |
|---|---|---|
| 0052453 | 5/1982 | European Pat. Off. . |
| 2480736 | 10/1981 | France . |
| 1-174998 | 7/1989 | Japan . |
| 1-176491 | 7/1989 | Japan . |
| 2-131187 | 5/1990 | Japan . |
| 2-131188 | 5/1990 | Japan . |
| 2-131189 | 5/1990 | Japan . |
| 2-131190 | 5/1990 | Japan . |
| 1318102 | 5/1973 | United Kingdom . |

OTHER PUBLICATIONS

Japan Atomic Energy Soc., (the fall meeting of 1987), K40 & K41, with partial English language translations thereof.
Japan Atomic Energy Soc., (the fall meeting of 1988), J27 & J28, with partial English language translations thereof.
Hirahara et al., 1988, JAIF, International Conference on Water Chemistry in Nuclear Power Plants, Proceedings, vol. 2, pp. 694–698.
The Fourth Japan Ion Exchange Meeting, Sep. 1988, with partial English language translation thereof.
Japan Atomic Energy Soc., (the meeting of 1989), J14 & J15, with partial English language translations thereof.
The Fourth Japan Ion Exchange Meeting, Collection of Lecture Abstract 9, with partial English language translation thereof.
Ebara Engineering Review, No. 145, Oct. 1989, pp. 49–53, with partial English translation thereof.
50th International Water Conference, Oct. 1989, pp. 552–565.

*Primary Examiner*—Ivars Cintins
*Attorney, Agent, or Firm*—Wenderoth, Lind & Ponack

[57] ABSTRACT

A method of mixed-bed filtration and demineralization for removing suspended impurities from the primary cooling water in a power plant by means of a demineralizer having a mixed bed formed of a particulate cation and anion exchange resin that have such a surface layer structure that granules are seen to bind with one another under microscopic examination, being able to be operated in a safe and yet economical manner by virtue of established conditions for operating processes, such as regeneration of the demineralizer by backwashing and by passage of chemicals and also, replacement of the demineralizer.

6 Claims, 6 Drawing Sheets

METHOD OF MIXED-BED FILTRATION AND DEMINERALIZATION WITH ION-EXCHANGE RESINS

This application is a continuation-in-part of now abandoned application, Ser. No. 07/790,754, filed on Nov. 12, 1991, now abandoned.

TECHNICAL FIELD

The present invention relates to a method of mixed-bed filtration and demineralization with ion-exchange resins and, more particularly, to a method of mixed-bed filtration and demineralization for removing suspended impurities from the primary cooling water in power plants using special ion-exchange resins.

PRIOR ART

In order to enable the interior of boilers used in steam power generating facilities to be always kept clean, the condensate water returning From the condensing turbine to the boiler is highly purified with a condensate demineralizer before it is supplied as cooling water into the boiler.

The condensate demineralizer is of a "mixed bed" type in which a cation exchange resin and an anion exchange resin are packed in admixture. Impurities in condensate water, i.e., ionic components and suspended solid components (chiefly comprised of fine particulate metal oxides), are separated by ion exchange and by adsorption and filtration so as to purify the condensate water. In this regard, ion exchange resins may be classified as organic polymeric adsorbents. Mixed beds of cation and anion exchange resins have conventionally been formed by using resins in gel form and/or porous resins.

In the conventional method of using particulate ion exchange resins, impurities such as ionic components and metal oxides that are adsorbed or trapped by ion exchange resins are removed by periodical regenerations with chemicals or through mechanical backwashing so as to maintain the condensate demineralizer in a clean condition.

While the efficiency of removing impurities from condensate water is important as regards both ionic components and metal oxides, enhanced separation of metal oxides has recently become particularly important for the operation of boiling water nuclear power plants as steam power generating Facilities. Such separation is carried out for the purpose of reducing the amount of radioactivity to which operators are exposed during periodical inspections of the plant by reducing the amount of metal oxides carried over from the cooling water into the nuclear reactor. It has, however, been found that this need cannot be met by the prior art method of using particulate ion exchange resins since it involves the following problems:

(1) In order to maintain the efficiency of removing metal oxides with ion-exchange resins, frequent cycles of regeneration by backwashing and by passage of chemicals are required but this can potentially increase the amount of radioactive wastes to be disposed of;

(2) The efficiency of removing metal oxides by means of conventional ion-exchange resins is solely dependent on the "aging effect", or the improvement in the efficiency of removal due to a certain kind of change in the resin surface that results from prolonged use of the resins and the effect that can be expected from virgin resins is not particularly great; and (3) The efficiency of removing metal oxides by means of conventional ion-exchange resins is not high enough to reach the level required of the user (or power plants).

U.S. Pat. No. 4,395,335 is concerned with "Reproduction Method of Filter Demineralizer in Condensate Cleanup System of Reactors", in which ion-exchange resins at a large pressure drop (operation time: around 30 days) of condensate in a filter demineralizer are regenerated by backwashing with water and air, and half of the regenerated ion-exchange resins are reused together with new ion-exchange resins in a range of 1:1 (by weight).

Consequently, it is strongly desired to further minimize the waste discharged out of the system or plant.

SUMMARY OF THE INVENTION

Under these circumstances, the present inventors previously developed an adsorbent for removing suspended impurities with the aid of ion-exchange resins having the great ability to separate and remove metal oxides (see U.S. patent application Ser. No. 07/888,431). The present invention is based on that previous proposal and has as an object providing a method of mixed-bed filtration and demineralization that uses a demineralizer packed with said ion-exchange resins and that can be operated in a safe and yet economical manner by virtue of established conditions for operating processes such as regeneration of the demineralizer by backwashing and by passage of chemicals, as well as by replacement of the resins.

Other objects and advantages of the present invention will become apparent to those skilled in the art from the following description and drawings.

BRIEF DESCRIPTION OF THE DRAWINGS

FIG. 2—1 is a graph showing the concentration of iron oxide at the inlet and outlet of a column;

FIG. 2—2 is a graph that corresponds to FIG. 2—1 and that shows the differential pressure across the resin layer in the column;

BEST MODE FOR CARRYING OUT THE INVENTION

In its first aspect, the present invention achieves the above-stated object by a method of mixed-bed filtration and demineralization for removing suspended impurities from the primary cooling water in a boiling water nuclear power plant by means of a demineralizer having a mixed bed formed of a particulate cation and anion exchange resin that have such a surface that granules are seen to bind with one another under microscopic examination, said method is characterized in that the demineralizer is regenerated by backwashing at
- (a) backwashing the exhausted anion and cation exchange resins in the demineralizer at the time when the increase in the differential pressure of water passage due to the entrapping of suspended impurities in the mixture has come to lie within the range of 0.2–0.8 kg/cm$^2$ or when the amount of iron oxide entrapped in the mixture has exceeded 1 g/L-R (g per liter of the resins) based on the amount of boundary-deposited iron, or when the concentration of suspended impurities at the outlet of the demineralizer exceeds 1.5 ppb; and
- (b) passing a chemical reagent through the demineralizer at the time either when regeneration by the backwashing (a) fails to decrease the concentration of suspended impurities at the outlet of the demineralizer to below 1.5 ppb, or when the amount of iron oxide has exceeded 9 g/L-R based on the amount of matrix-diffused iron.

In an embodiment, a monitor column is installed and the water to be treated is passed through said monitor column in parallel with its passage through the demineralizer under the same conditions as those for the passage of water through the latter and the timings of regeneration by backwashing and by passage of a chemical are detected by measurements with said monitor column.

In another embodiment, the resins in the demineralizer are replaced at the time when the amount of matrix-diffused iron entrapped by the resins in the monitor column has exceeded 15 g/L-R or when the concentration of total organic carbon at the outlet of the monitor column has exceeded 10 ppb in terms of an increment.

In its third aspect, the present invention achieves the above-mentioned object by a method of mixed-bed filtration and demineralization for removing suspended impurities from the primary cooling water in a boiling water nuclear power plant by means of a demineralizer having a mixed bed formed of a particulate cation and anion exchange resin that have such a surface layer structure that granules are seen to bind with one another under microscopic examination, said method is characterized in that the water to be treated is passed through the demineralizer after discharging the water remaining in it and refilling it with pure water.

The term "the amount of boundary-deposited iron" as used hereinabove means the amount of suspended impurities that have been entrapped in the ion-exchange resins and that are subsequently dislodged by repeated cycles of air scrubbing and water backwashing with overflows. After measuring the amount of such "boundary-deposited iron", the resins are cleaned thoroughly with an ultrasonic cleaner to dislodge the impurities that have been adsorbed on the surfaces of resin beads and the thus removed impurities are called "surface-adsorbed iron". The amount of such impurities is accordingly referred to as "the amount of surface-adsorbed iron". After measuring the amount of surface-adsorbed iron, the resins are treated with warm hydrochloric acid to have the impurities desorbed from within the resin beads and the amount of thus dissolved impurities is measured to give the "amount of matrix-diffused iron".

The conventional regeneration of ion exchange resins by backwashing and passing of a chemical (anion exchange resins are generally regenerated with sodium hydroxide, etc. and cation exchange resins are regenerated with hydrochloric acid, sulfuric acid, etc.) is generally described in "ION EXCHANGE TECHNOLOGY" published by ACADEMIC PRESS INC. in 1959, and also in "PRACTICAL PRINCIPLES OF ION EXCHANGE WATER TREATMENT" published by TALL OAKS PUBLISHING, INC. in 1985. The chemical employed in the present invention is the same as the conventional one.

We now describe the particulate cation and anion exchange resin that are to be used in the method of the present invention for mixed-bed filtration and demineralization.

The anion and cation exchange resins are comprised as follows:
- (1) said cation exchange resin has a dual structure with a skin layer being present to a depth of at least 0.1–10 μm from the surface;
- (2) both said resins comprise particles in a true spherical form having a diameter of 0.2–1.2 mm, said cation exchange resin having an effective specific surface area of 0.02–0.20 m$^2$ per each gram of the dry resin, and said anion exchange resin having an effective specific surface area of 0.02–0.10 m$^2$ per each gram of the dry resin, with the effective specific surface area being measured on the basis of the amount of adsorption of krypton;
- (3) said cation exchange resin has such a surface layer structure wherein unit granules having a size of 0.1–1.0 μm are seen to bind with one another when examined under a scanning electron microscope in a field of view ranging from a magnification of 50 to 200,000, preferably from 1,000 to 10,000;
- (4) said cation exchange resin has a honeycomb and/or scaly surface structure with grooves in the surface, unit honeycombs and/or scales each having a unit surface area of 1–50 μm$^2$ and agglomerating together to form an irregular surface structure and morphology, with the surface being such that the individual unit honeycombs and/or scales are adjacent to one another via grooves having a width of 0.1–5.0 μm and a depth of 0.1–5.0 μm, said grooves having an overall length of 100–1,000 mm/m$^2$;
- (5) both said resins have a crosslinking degree of from 3 to 8%;
- (6) said cation exchange resin has a surface pH (the concentration of hydrogen ions at the solid surface) of 1.50–1.90 in a wet state, concerning and said anion exchange resin has a surface pH of 11.50–13.80 in a wet state; and
- (7) said cation exchange resin has an interfacial electrokinetic potential (zeta potential) of −20 to −40 mV in a powder state obtained by pulverization, and said anion exchange resin has an interfacial electrokinetic potential of +20 to +45 mV in a powder state obtained by pulverization.

The resins in the shape of true spherical particles may be finely pulverized to obtain resins in powder form.

Either one of the resins described above may be used as the constituent of a packing layer and/or a filter layer to make a demineralizer that is capable of removing suspended impurities from ultrapure water or condensate water with enhanced efficiency.

The resins used in the present invention have such a surface and/or surface structure that they are capable of selective adsorption and removal of metal oxides. Hence, compared to ion exchange resins used in conventional "mixed bed" type demineralizers, the resins to be used in the present invention have a higher affinity for metal oxides and are capable of separating and removing them with a higher degree of efficiency. Accordingly, when used in demineralization, those resins have the advantage of producing higher pure water containing smaller amounts of metal oxides.

The above-described ion-exchange resins which are to be used in the present invention can be produced by various known methods such as those described in Japanese Patent Laid-Open Publication Nos. 18705/1984 and 98117/1984.

The mixed-bed type filtering/demineralizing apparatus to be used in the method of the present invention is preferably operated in the following manner: a demineralizer is formed by packing a mixed bed of the particulate ion-exchange resins which have the capability of removing suspended impurities and that are loaded to a height of 500-1500 mm, desirably 900-1100 mm; cooling water is supplied into the demineralizer from its top and passed through it at a linear speed of 20-130 m/h (on the basis of the cross-sectional area of the demineralizer), desirably 70-120 m/h; the cooling water is withdrawn from the lateral side or bottom of the demineralizer; and the suspended impurities as well as the ionic impurities are removed.

Operation

In accordance with the method of the present invention for filtering and demineralizing water using the above-described mixed-bed apparatus for filtration and demineralization, the amount of radioactive wastes to be disposed of can be reduced by starting the regeneration of the demineralizer by backwashing at the time when the increase in the differential pressure of water passage due to the entrapping of suspended impurities in the resin layer has come to lie within the range of 0.2-0.8 $kg/cm^2$, desirably at 0.5 $kg/cm^2$. Conventionally, demineralizers are regenerated by backwashing at a constant interval of about 25 days per column in order to prevent suspended impurities from leaking down the demineralizer and to thereby maintain good water quality. However, this practice has caused various problems including an increased work load for the operating personnel and an increased amount of radioactive wastes to be disposed of and there has been no way to solve those problems. In addition, existing plants have such a small capability of trapping suspended impurities that the elevation in the differential pressure of water passage is not significant enough to control said differential pressure in the manner proposed by the present invention.

In accordance with the method of the present invention for filtering and demineralizing water, the amount of radioactive wastes to be disposed of can also be reduced by starting the regeneration of the demineralizer by the passage of chemicals when substantial deterioration occurs in the quality of the water being treated by the demineralizer, namely, at the time when regeneration by backwashing achieves no further improvement in the quality of water at the outlet, with the result that the concentration of suspended impurities at the outlet of the demineralizer does not fall below a value of 1-3 ppb, desirably 1.5 ppb.

Conventionally, demineralizers are regenerated by passing chemicals at a constant interval of about 100 days in order to remove the suspended impurities trapped by ion-exchange resins and to thereby maintain good water quality. However, this practice has caused various problems including an increased load on the operating personnel and an increased amount of radioactive wastes to be disposed of and there has been no way to solve those problems.

In accordance with the method of the present invention for filtering and demineralizing water, the amount of radioactive wastes to be disposed of can also be reduced by controlling the operation of the demineralizer in such a way that regeneration by backwashing and regeneration by the passage of chemicals are started in view of the amount of iron oxide entrapped by the ion-exchange resins.

Further, in accordance with the present invention, a monitor column is installed and the water to be treated is passed through said monitor column in parallel with its passage through the demineralizer under the same conditions as those for the passage of water through the latter and the timings of regeneration by backwashing and by passage of a chemical, as well as the timing of resin replacement are controlled in the following manner in view of the pressure difference developing across the monitor column, as well as the amount of iron oxide entrapped by the ion-exchange resins and the concentration of total organic carbon at the outlet of the monitor column. This practice is effective for the purpose of reducing the amount of radioactive wastes to be disposed of while maintaining the purity of the treated water at high level.

(1) If regeneration by backwashing is started at the time when the increase in the pressure difference across the monitor column is within the range of 0.2-0.8 $kg/cm^2$, desirably at 0.5 $kg/cm^2$, both the load on the operating personnel and the amount of radioactive wastes to be disposed of can be reduced to one third of the levels that have been common in the prior art practice.

Alternatively, regeneration by backwashing may be started at the time either when the amount of boundary-deposited iron entrapped by the resins in the monitor column comes to lie within the range of 1.0-1.5 g/L-R, desirably at 1.5 g/L-R, or when the concentration of suspended impurities at the outlet of the demineralizer exceeds 1.5 ppb, and this practice also ensures that both the work load for the operating personnel and the amount of radioactive wastes to be disposed of can be reduced to one third of the levels that have been common in the prior art practice.

(2) If regeneration by passage of chemicals is started at the time either when regeneration by the backwash achieves no further improvement in the quality of water at the outlet, with the result that the concentration of suspended impurities at the outlet of the demineralizer does not fall below 1.5 ppb or when the amount of matrix-diffused iron entrapped by the resins in the monitor column comes to lie within the range of 6-9 g/L-R, desirably at 9 g/L-R, both the work load for the operating personnel and the amount of radioactive wastes to be disposed of can be reduced to one third of the levels that have been common in the prior art practice.

(3) If the replacement of resins is effected at the time either when the amount of matrix-diffused iron entrapped by the resins in the monitor column has exceeded 15-20 g/L-R or when the concentration of total organic carbon at the outlet of the monitor column has increased by an increment greater than 10-50 ppb, the purity of the treated water can be maintained at high level.

EXAMPLES

The following examples are provided for the purpose of further illustrating the present invention but are in no way to be taken as limiting.

Example 1

Figure 1:
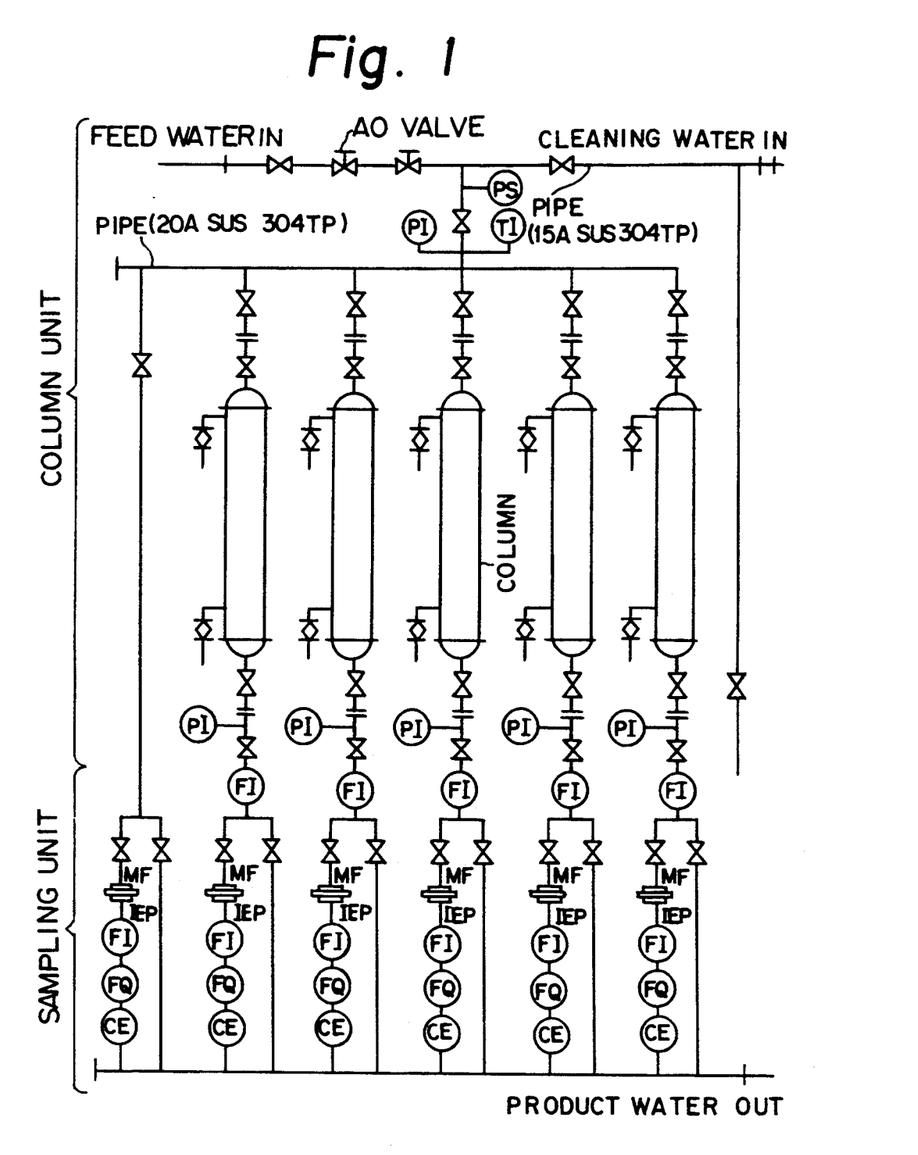
FIG. 1 is a flow diagram of a "mixed bed" column testing apparatus.

The performance for removing suspended impurities with the mixed bed of resins prepared in this Example was tested under the following conditions using test equipment of the type shown in FIG. 1:

(i) Resins: The combination of a conventional strong acid, gel type cation exchange resin with a conventional anion exchange resin, as well as the combination of a strong acid, gel type cation exchange resin with an anion exchange resin, both prepared in accordance with the present invention; those ion exchange resins were used in admixtures to form "mixed beds".

(ii) Amount of resins used: Columns were packed with cation and anion exchange resins that were mixed in a volume ratio of 1.6/1 to provide a bed height of 90 cm (about 2 l).

(iii) Linear velocity of feed water: $LV = 108$ m/h.

The test equipment shown in FIG. 1 consisted of a column unit and a sampling unit. The column unit was basically composed of columns to be packed with the resins described above, pipes through which the water to be treated was passed under the conditions specified above, associated valves, pressure switches PS, pressure gages PI, and thermometers TI. The sampling unit was composed of pipes by which the water filtered and demineralized with the resins was directed to the outlets, flow meters FI, membrane filters MF, ion-exchange filters IEP, flow quantity meters FQ and conductivity electrometers CE. The feed water 1 was treated under the conditions set forth above and the concentration of iron oxide at the outlet for treated water was measured at given time intervals.

Figure 21:
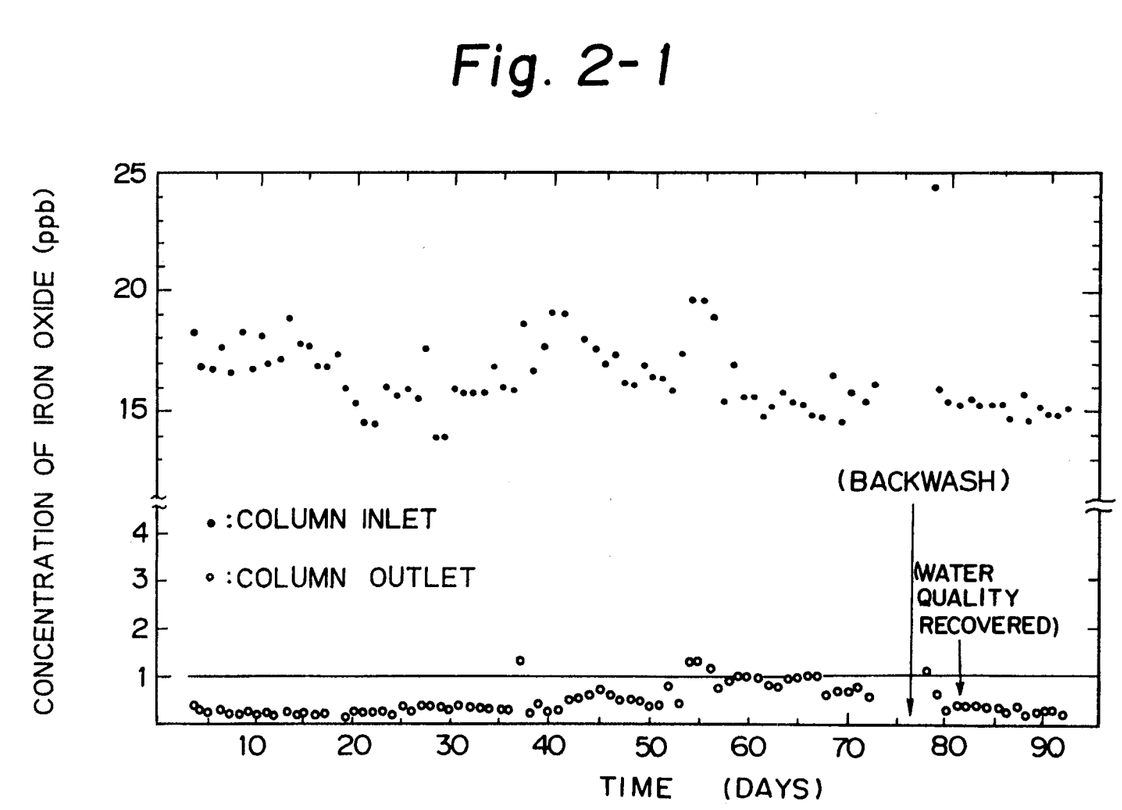
Figure 22:
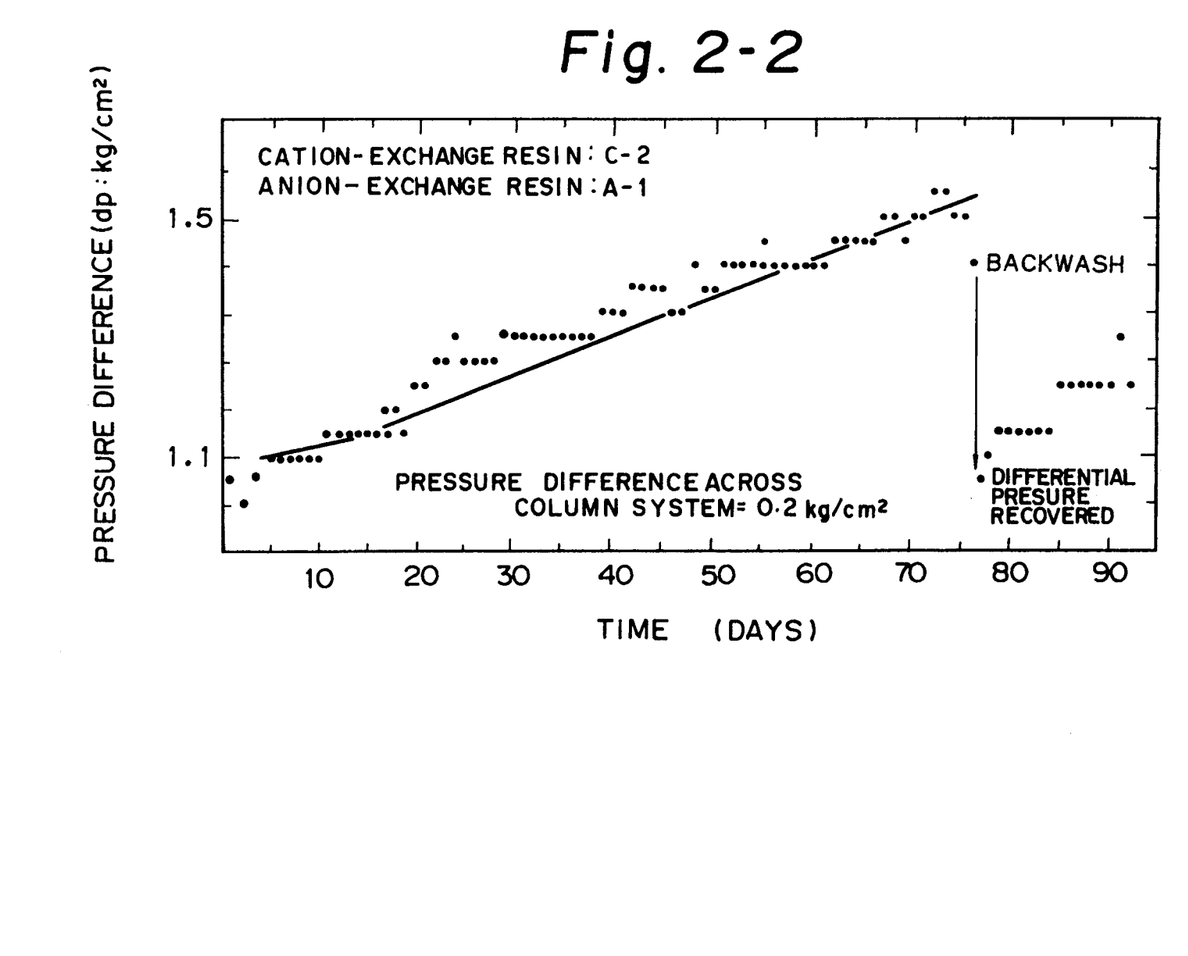

FIG. 2 shows the results of investigation of the performance of the resins of the present invention in removing suspended impurities with the column test equipment; FIG. 2-1 shows the profiles of the concentration of impurities at the inlet and outlet of columns and FIG. 2-2 shows the profiles of pressure difference across resin layer. For the impurity concentration of about 17 ppb at column inlet, the outlet concentration was less than 1 ppb, showing that at least about 16 ppb was entrapped by the resin layers. As a result of the entrapping, the pressure difference across the resin layer increased up to 0.5 kg/cm$^2$, which was the value observed after water passage for about 75 days. At that time, the columns were backwashed for regeneration and the pressure difference across the resin layer returned to the initial value observed in the clean condition. At the same time, the concentration of impurities at the column outlet decreased to the initial level.

Before the pressure difference across the resin layer rose by 0.5 kg/cm$^2$, there was not need at all to backwash the columns and this contributed to a reduction both in the work load for the operating personnel and in the amount of radioactive wastes to be disposed of.

As regards one demineralizer column (in an 8-column plant), three cycles of regeneration by backwashing have been necessary in the prior art during a 75-day operation. According to the present invention, only one cycle of backwashing need be performed and both the work load for the operating personnel and the amount of radioactive wastes to be disposed of can be reduced to one third of the levels that have been observed with existing plants.

Example 2

Figure 3:
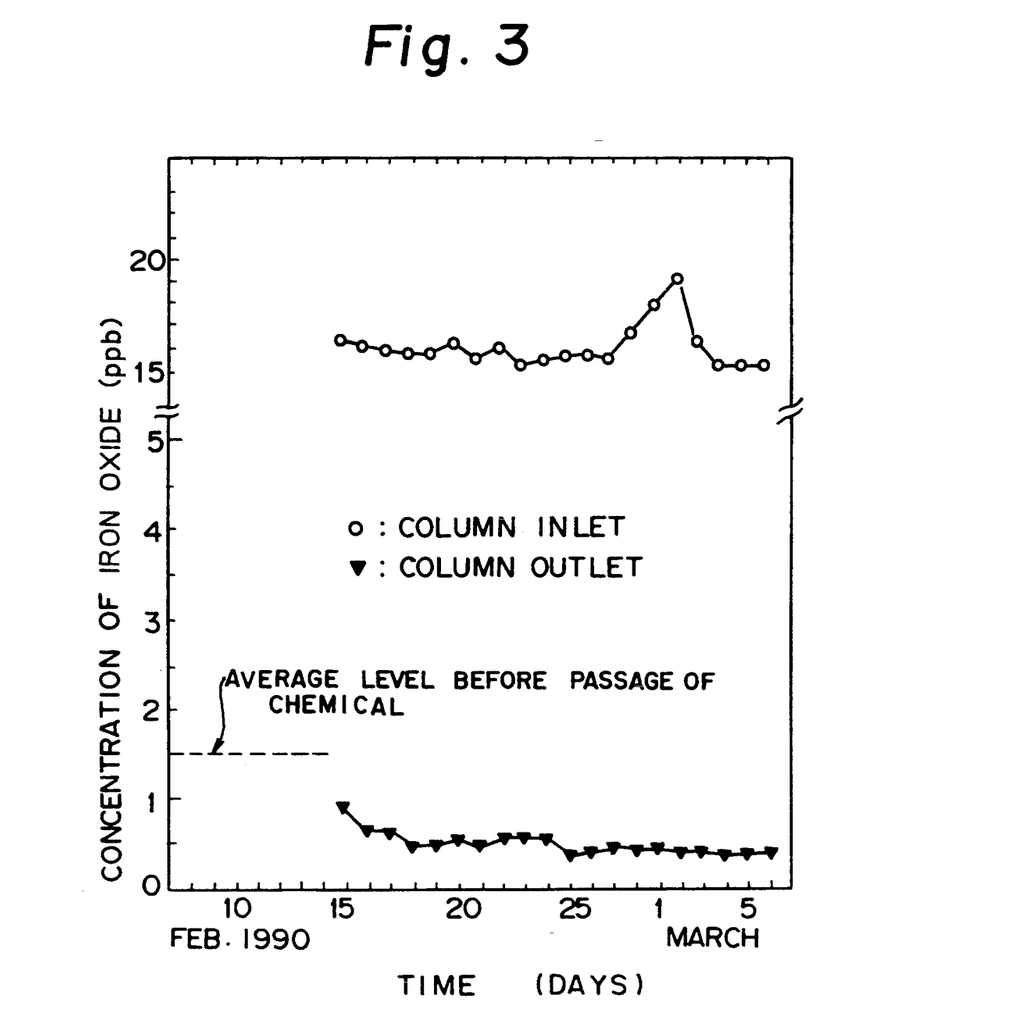
FIG. 3 is a graph showing the concentration of iron oxide at the inlet and outlet of the column after regeneration by passage of a chemical.

FIG. 3 shows the results of another investigation of the performance of the ion-exchange resins of the present invention for removing suspended impurities using the column test equipment of Example 1. FIG. 3 plots against time the changes in the concentration of impurities at the inlet and outlet of columns. Upon passage of the feed water for about 340 days, the concentration of impurities at column outlet rose up to about 1.5 ppb; however, by subsequent passage of a chemical for regeneration followed by passage of the feed water, the outlet concentration of impurities dropped to 0.5 ppb and water of good quality was successfully obtained.

Before the outlet concentration of impurities rose to about 1.5 ppb, there was no need at all to pass chemicals for regeneration and this contributed to a reduction both in the work load for the operating personnel and in the amount of radioactive wastes to be disposed of.

As regards one demineralizer column, regeneration by passage of a chemical has been performed in the prior art at a constant interval of 100 days. According to the present invention, a chemical for regeneration need be passed at an interval of about 340 days and both the work load for the operating personnel and the amount of radioactive wastes to be disposed of can be reduced to one third of the levels that have been observed with existing plants.

Example 3

Figure 4:
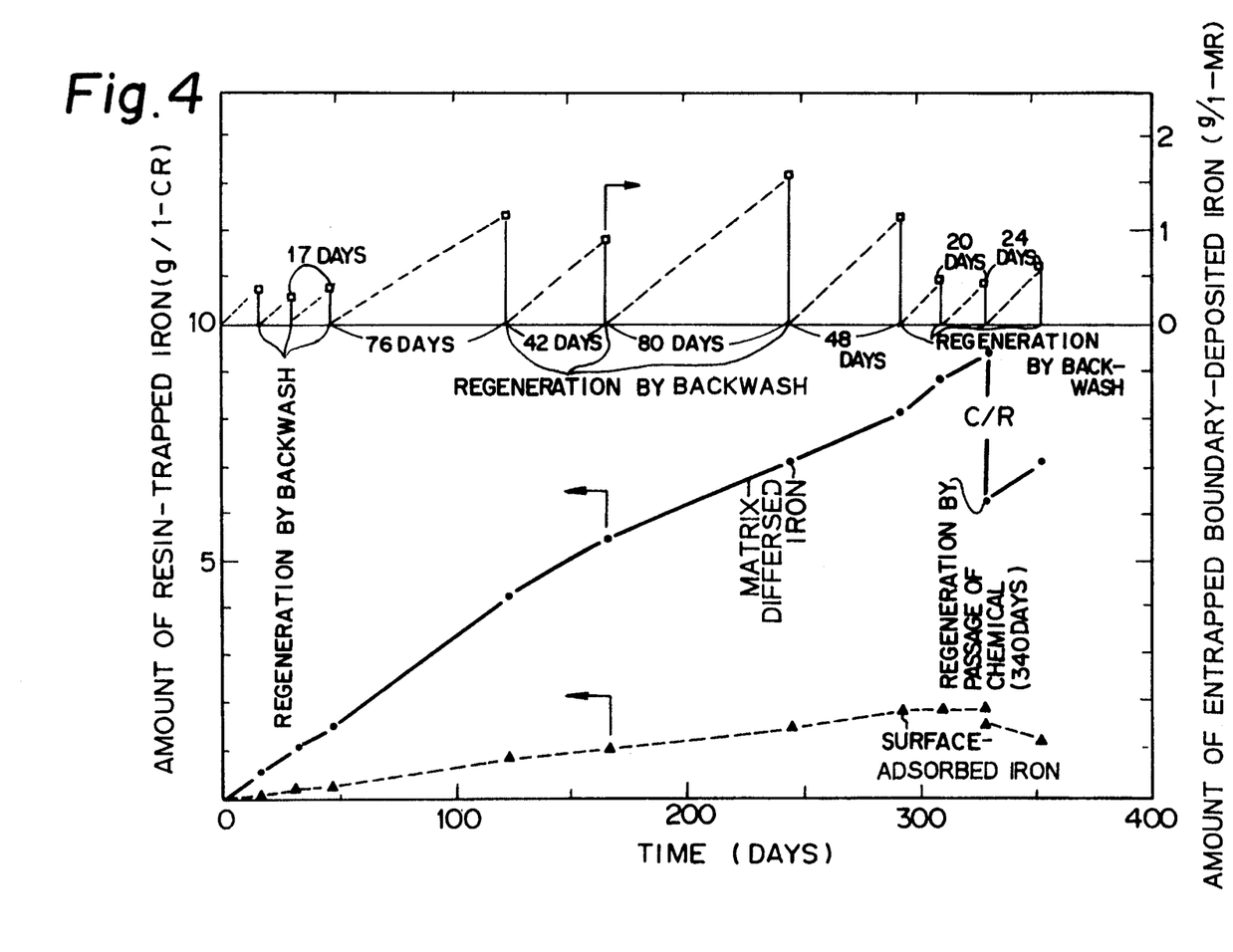
FIG. 4 is a graph showing the changes in the amounts of boundary-deposited iron, matrix-diffused iron and surface-adsorbed iron as a function of the days for which the feed water was passed and of the cycles of regeneration.

FIG. 4 shows the results of still another investigation conducted with the ion-exchange resins of the present invention that were packed in the column test equipment of Example 1, followed by passage of the feed water and backwashing for regeneration. In the investigation, the impurities entrapped by the resins were classified into three types, boundary-deposited iron, surface-adsorbed iron and matrix-diffused iron, and their respective concentrations were measured at given time intervals. The concentration of boundary-deposited iron increased with the passage of the feed water and after passage for 75–80 days, about 1.5 g/L-R of boundary-deposited iron had been entrapped. The entrapped boundary-deposited iron could be removed by each cycle of regeneration by backwashing. On the other hand, matrix-diffused iron could not be removed by backwashing, so its concentration increased with the passage of feed water, reaching about 9 g/L-R upon passage of the feed water for about 340 days. However, by passing a chemical for regeneration at that point of time, the concentration of matrix-diffused iron dropped to about 6 g/L-R.

In order to measure the concentrations of boundary-deposited iron, surface-adsorbed iron and matrix-diffused iron, the mixed bed of resins through which the water to be treated was passed through the test equipment of Example 1 for a specified period was withdrawn from the columns after ceasing the passage of feed water and, thereafter, the suspended impurities entrapped by the resins were separated into respective types and assayed by the following procedure.

First, the mixed bed of resins extracted from each column was packed into a separate analytical column (100 mm$^\phi$ × 1200 mm$^h$) and subjected to repeated cycles of air scrubbing and backwashing with overflows, whereby the suspended impurities entrapped in the mixed bed were dislodged. The amount of the dislodged impurities was measured to give the concentration of "boundary-deposited iron".

Second, the resins for which the concentration of boundary-deposited iron was measured was cleaned thoroughly with an ultrasonic cleaner to dislodge the impurities adsorbed on the surfaces of resin beads. The amount of the thus dislodged impurities was measured to given the concentration of "surface-adsorbed iron".

Thirdly, the resins for which the concentration of surface-adsorbed iron was measured was treated with warm hydrochloric acid to desorb impurities from within the resin beads. The amount of the thus leached impurities was measured to give the concentration of "matrix-diffused iron".

Example 4

Figure 5:
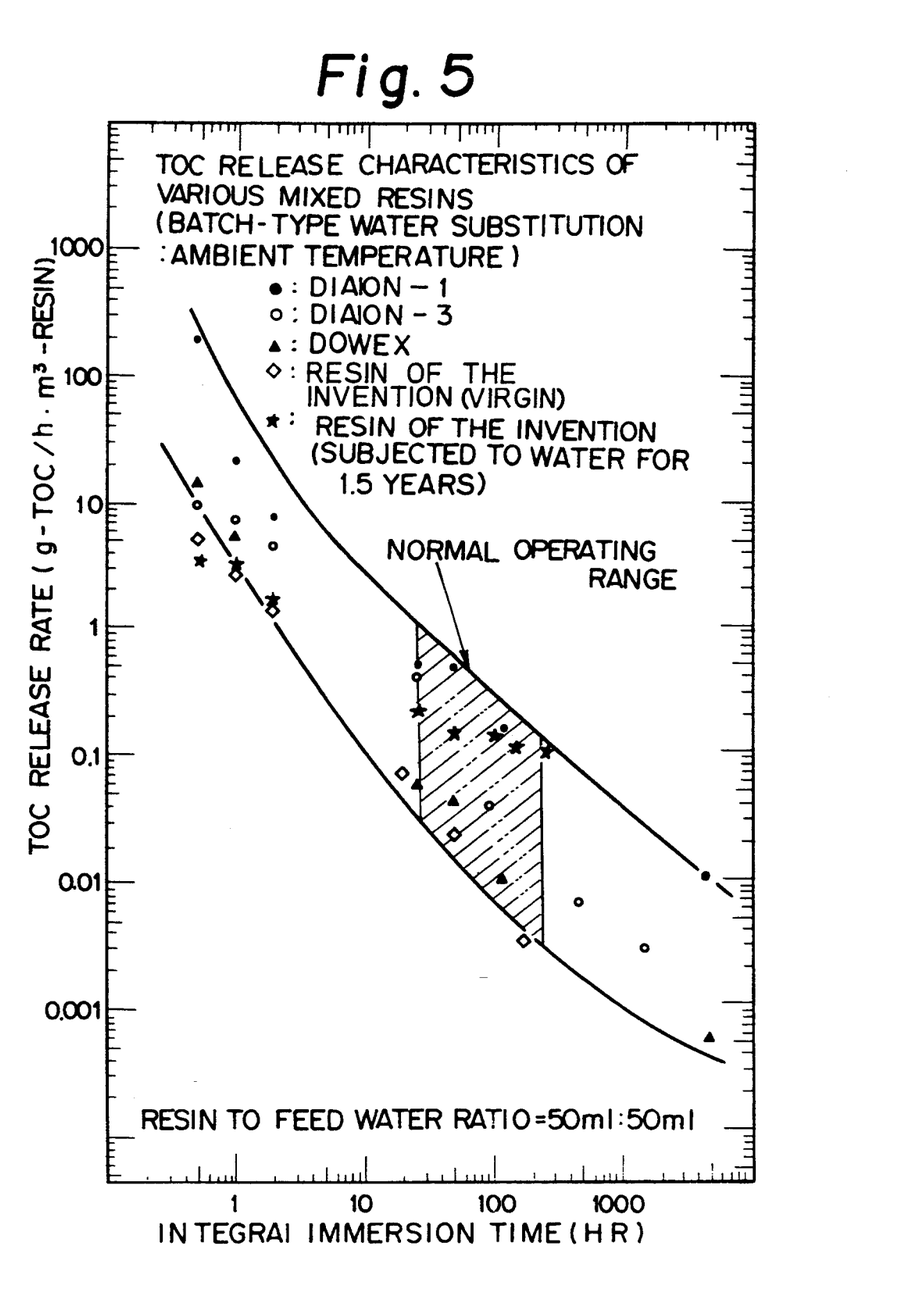
FIG. 5 is a graph showing the profile of TOC release rate as a function of the integral of immersion time.

FIG. 5 shows the results of immersing the mixed bed of resins into pure water. The horizontal axis of the graph in FIG. 5 plots the integral of the time of immersion and the vertical axis plots the release of TOC (total organic carbon) from 1 $m^3$ of resin per hour. The TOC release characteristics of the ion-exchange resins prepared in accordance with the present invention are compared with those of conventional resins.

The release rate of TOC tends to decrease with the lapse of time and is obviously dependent on the type of resin used; with the resins of the present invention, the TOC release rate has a tendency to increase with time.

When a mixed bed of resins is used in actual operations, a means is adopted that insures that TOC which dissolves out in a large amount in the initial period is rejected before the feed water is passed, whereby the amount of TOC carried into the condensate water is reduced. This method enables the plant to be started up with the concentration of TOC in the condensate water being reduced to no more than one third of the level that is normal in the prior art.

The TOC release characteristics depicted in FIG. 5 were measured by the following procedure:

(1) 30.8 ml of a cation-exchange resin and 19.2 ml of an anion-exchange resin were sampled and put into a 100-ml beaker;

(2) 50 ml of ultrapure water ($\leq 0.1$ ppm of TOC) was added to the mixture of resins and the resulting mixture was stirred for 3 minutes, followed by standing for 27 minutes;

(3) the mixture was subjected to filtration and the concentration of TOC in the filtrate was measured; and (4) the filtered mixed bed of resins was replaced into a beaker and ultrapure water was added, followed by standing for a predetermined time and agitation for 3 minutes; after standing for 27 minutes, the mixture was subjected to step (3); the above procedure was continued for at least 200 hours to determine the TOC release characteristics of the resins used.

According to the embodiment shown in FIG. 4, of the present application, all of the ion-exchange resins are used over an operation time of 400 days or more while they are regenerated by backwashing and passing a chemical. On the other hand, in U.S. Pat. No. , 4,395,335, half of the ion-exchange resins are discharged at a large pressure drop (operation time around 30 days). Therefore, the amount of ion-exchange resins to be discharged out of the plant in the present invention is decreased to ($30 \times 1/400 =$) about 1/6.

Industrial Applicability

By controlling the regeneration step of the method of mixed-bed filtration and demineralization in the manner described on the foregoing pages, the present invention insures that the work load for the operating personnel and the amount of radioactive wastes to be disposed of are reduced to smaller levels than in the prior art.

What is claimed is:

1. A method of regenerating a mixture of exhausted anion and cation exchange resins from a mixed bed demineralizer in a condensation cleanup system in a power plant, in which method water containing suspended impurities including iron oxide is passed through the demineralizer to entrap said impurities in the resin mixture of the demineralizer and in which the treated water is then recovered from an outlet of the demineralizer, comprising the steps of:

(a) backwashing the exhausted anion and cation exchange resins in the demineralizer at a time either when an increase in differential pressure of water passage due to entrapping of suspended impurities in the mixture has come to lie within a range of 0.2–0.8 $kg/cm^2$ or when an amount of iron oxide entrapped in the mixture has exceeded 1 g per liter of the resins based on an amount of boundary-deposited iron, or when a concentration of suspended impurities at an outlet of the demineralizer exceeds 1.5 ppb; and (b) passing a chemical reagent through the demineralizer at a time either when regeneration by the backwashing (a) fails to decrease a concentration of suspended impurities at the outlet of the demineralizer to below 1.5 ppb, or when the amount of iron oxide has exceeded 9 g per liter of the resins based on an amount of matrix-diffused iron;

wherein (1) said cation exchange resin has a dual structure with a skin layer being present to a depth of at least 0.1–10 $\mu m$ from the surface;

(2) both said resins comprise particles in a true spherical form having a diameter of 0.2–1.2 mm, said cation exchange resin having an effective specific surface area of 0.02–0.20 $m^2$ per each gram of the dry resin, and said anion exchange resin having an effective specific surface area of 0.02–0.10 $m^2$ per each gram of the dry resin, with the effective specific surface area being measured on the basis of the amount of adsorption of krypton;

(3) said cation exchange resin has such a surface layer structure wherein unit granules having a size of 0.1–1.0 $\mu m$ are seen to bind with one another when examined under a scanning electron microscope in a field of view ranging from a magnification of 50 to 200,000;

(4) said cation exchange resin has a honeycomb and/or scaly surface structure with grooves in the surface, unit honeycombs and/or scales each having a unit surface area of 1–50 $\mu m^2$ and which together with each other form an irregular surface structure and morphology, with the surface being such that the individual unit honeycombs and/or scales are adjacent to one another via grooves having a width of 0.1–5.0 $\mu m$ and a depth of 0.1–5.0 $\mu m$, said grooves having an overall length of 100–1,000 $mm/mm^2$;

(5) both said resins have a crosslinking degree of from 3 to 8%;
(6) said cation exchange resin has a surface pH of 1.50–1.90 in a wet state, and said anion exchange resin has a surface pH of 11.50–13.80 in a wet state; and
(7) said cation exchange resin has an interfacial electrokinetic potential of −20 to −40 mV in a powder state, and said anion exchange resin has an interfacial electrokinetic potential of +20 to +45 mV in a powder state.

2. A method as claimed in claim 1, wherein contaminated water is passed simultaneously and in parallel through a monitoring and measuring column under the same conditions that the water is passed through the demineralizer.

3. A method as claimed in claim 2, wherein the ion exchange resins are replaced when the amount of matrix-diffused iron sorbed in the resins is higher than 15 g per liter of the resins or the concentration of organic carbon at an outlet of a monitoring and measuring column exceeds 10 parts per billion.

4. A method as claimed in claim 1, wherein the ion exchange resins are replaced when the amount of matrix-diffused iron sorbed in the resins is higher than 15 g per liter of the resins, or the concentration of organic carbon at an outlet of a monitoring and measuring column exceeds 10 parts per billion.

5. A method as claimed in claim 1, wherein the field of view in said microscope is from 1,000 to 10,000 magnifications.

6. A method as claimed in claim 1, wherein residual water in the demineralizer is rejected and the demineralizer is filled with pure water, before water containing suspended impurities including iron oxide is passed through the demineralizer.

* * * * *